United States Patent
Shirvani et al.

(10) Patent No.: US 10,216,521 B2
(45) Date of Patent: Feb. 26, 2019

(54) ERROR MITIGATION FOR RESILIENT ALGORITHMS

(71) Applicant: NVIDIA Corporation, Santa Clara, CA (US)

(72) Inventors: Philip Payman Shirvani, Santa Clara, CA (US); Richard Gavin Bramley, Santa Clara, CA (US); John Montrym, Los Altos Hill, CA (US)

(73) Assignee: NVIDIA Corporation, Santa Clara, CA (US)

( * ) Notice: Subject to any disclaimer, the term of this patent is extended or adjusted under 35 U.S.C. 154(b) by 72 days.

(21) Appl. No.: 15/628,403

(22) Filed: Jun. 20, 2017

(65) Prior Publication Data
US 2018/0365017 A1    Dec. 20, 2018

(51) Int. Cl.
*G06F 9/30* (2018.01)
*G06F 9/38* (2018.01)
*G06F 9/48* (2006.01)

(52) U.S. Cl.
CPC .......... *G06F 9/3863* (2013.01); *G06F 9/3865* (2013.01); *G06F 9/4812* (2013.01)

(58) Field of Classification Search
CPC .................................................. G06F 9/3863
See application file for complete search history.

(56) References Cited

U.S. PATENT DOCUMENTS

| | | | | |
|---|---|---|---|---|
| 5,745,398 A * | 4/1998 | Monier | ................ | G06F 7/728 380/30 |
| 8,316,261 B2 * | 11/2012 | Pfeiffer | ............ | G06F 11/0715 714/38.1 |
| 9,250,990 B2 * | 2/2016 | Motwani | ............... | G06F 11/076 |
| 9,448,875 B2 * | 9/2016 | Flautner | .............. | G06F 11/1604 |
| 2012/0047100 A1 * | 2/2012 | Lehner | ...................... | G06F 8/34 706/46 |
| 2012/0233612 A1 * | 9/2012 | Beckett | ............... | G06F 9/45533 718/1 |
| 2014/0137078 A1 * | 5/2014 | Agha | .................. | G06F 9/45516 717/114 |
| 2016/0161557 A1 * | 6/2016 | Mazzawi | ......... | G01R 31/31703 714/732 |
| 2017/0091028 A1 * | 3/2017 | Golan | .................. | G11C 16/349 |

FOREIGN PATENT DOCUMENTS

| EP | 0606803 B1 | 10/1997 |
|---|---|---|
| EP | 2085883 A1 | 8/2009 |

OTHER PUBLICATIONS

Memik et al., "Increasing Register File Immunity to Transient Errors," Electrical and Computer Engineering Dept. Northwestern University, Computer Science and Engineering Dept. Pennsylvania State University, 2005, pp. 1-6, as retrieved from https://pdfs.semanticscholar.org/963f/cc1d6f977e894886ed2821a757327c17190f.pdf.

* cited by examiner

*Primary Examiner* — William B Partridge
(74) *Attorney, Agent, or Firm* — Zilka-Kotab, PC

(57) ABSTRACT

A method, computer readable medium, and system are disclosed for error coping. The method includes the steps of receiving, by a processing unit, a set of program instructions including a first program instruction that is responsive to error detection, detecting an error in a value of a first operand of the first program instruction, and determining that error coping execution is selectively enabled for the first instruction. The value for the first operand is replaced with a substitute value and the first program instruction is executed by the processing unit.

20 Claims, 9 Drawing Sheets

| Opcode 280 | Operand 285 | Error Coping 290 | Operand 295 | Destination 282 |

ERROR MITIGATION FOR RESILIENT ALGORITHMS

FIELD OF THE INVENTION

The present invention relates to error handling, and more particularly to error coping for circuits.

BACKGROUND

Transient and intermittent faults in storage circuits (e.g., RAM, registers, etc.) may cause errors during the execution of programs when affected values read from the storage circuits are used to perform computations. Existing error handling techniques use parity or error correction code (ECC) checking to detect that a value read from a storage circuit is not correct. When an error is detected, a retry (if possible) may be initiated or the operation may be stopped and the error may be flagged.

More recently, errors are caused when supply voltages are reduced to lower the power consumption of a circuit. An example of error-handling for errors resulting from reductions in supply voltage levels is a word masking and bit masking technique disclosed in "Minerva: Enabling Low-Power, Highly-Accurate Deep Neural Network Accelerators" by Reagen et al., that uses a razor circuit to determine if a weight value read out of an SRAM has an error. When the razor circuit indicates the weight value has an error, a zero is substituted for the weight value (i.e., word masking) or the sign bit of the weight value is substituted for any incorrect bits (i.e., bit masking). Substituting a zero allows the computation to continue, and typically reduces the amount of the error in the final result. Razor circuits are included for each column of the SRAM to detect an error in any bit that is read from the SRAM. The razor circuits increase the power consumption and die area of the SRAM and do not correct the errors that are detected. Additional circuitry is needed to correct the errors. There is a need for addressing these issues and/or other issues associated with the prior art.

SUMMARY

A method, computer readable medium, and system are disclosed for error coping. The method includes the steps of receiving, by a processing unit, a set of program instructions including a first program instruction that is responsive to error detection, detecting an error in a value of a first operand of the first program instruction, and determining that error coping execution is selectively enabled for the first instruction. The value for the first operand is replaced with a substitute value and the first program instruction is executed by the processing unit.

DETAILED DESCRIPTION

Instruction operands are held in storage resources (SRAM, flip-flops, registers, etc.) and circuitry of the storage resources is subject to random or intermittent hardware faults such as bit flips caused by radiation or read errors due to marginal circuit operation. Some algorithms are inherently resilient to incorrect operands and the incorrect values of operands can be replaced with a fixed value, such as zero. The fixed value is also likely incorrect, but the effect of the error is reduced or mitigated. In the context of the following description, resilient algorithms are defined as computer-implemented algorithms that can tolerate a certain amount of error during calculations. For example, if one or a few addition operations among the many operations that occur during execution of the resilient algorithm are miscalculated, the final result is either the same or within an acceptable range of the correct (error free) answer. One such class of resilient algorithms is neural networks, such as the neural networks used in deep learning. However, the error coping techniques discussed further herein may also be applied to other classes of resilient algorithms.

Data transformation operations such as multiplication, addition, or fused multiply-addition operations are used extensively in neural network algorithms. The weights of the network connections and the 'feature' weights (i.e., activations) are input operands to the data transformation operations. The overall output of the neural networks can be impacted by errors in the operands. However, neural networks have some inherent resiliency to incorrect operands. In contrast with existing error handling techniques that replace the value of the operand with zero, when an error in an operand is detected, the error coping technique may replace the value of the operand with a programmable value, the last operand value that did not have an error, or a computed value. When the erroneous operand value is replaced, the effect of the local error on the final output of the algorithm is typically reduced.

Figure 1:
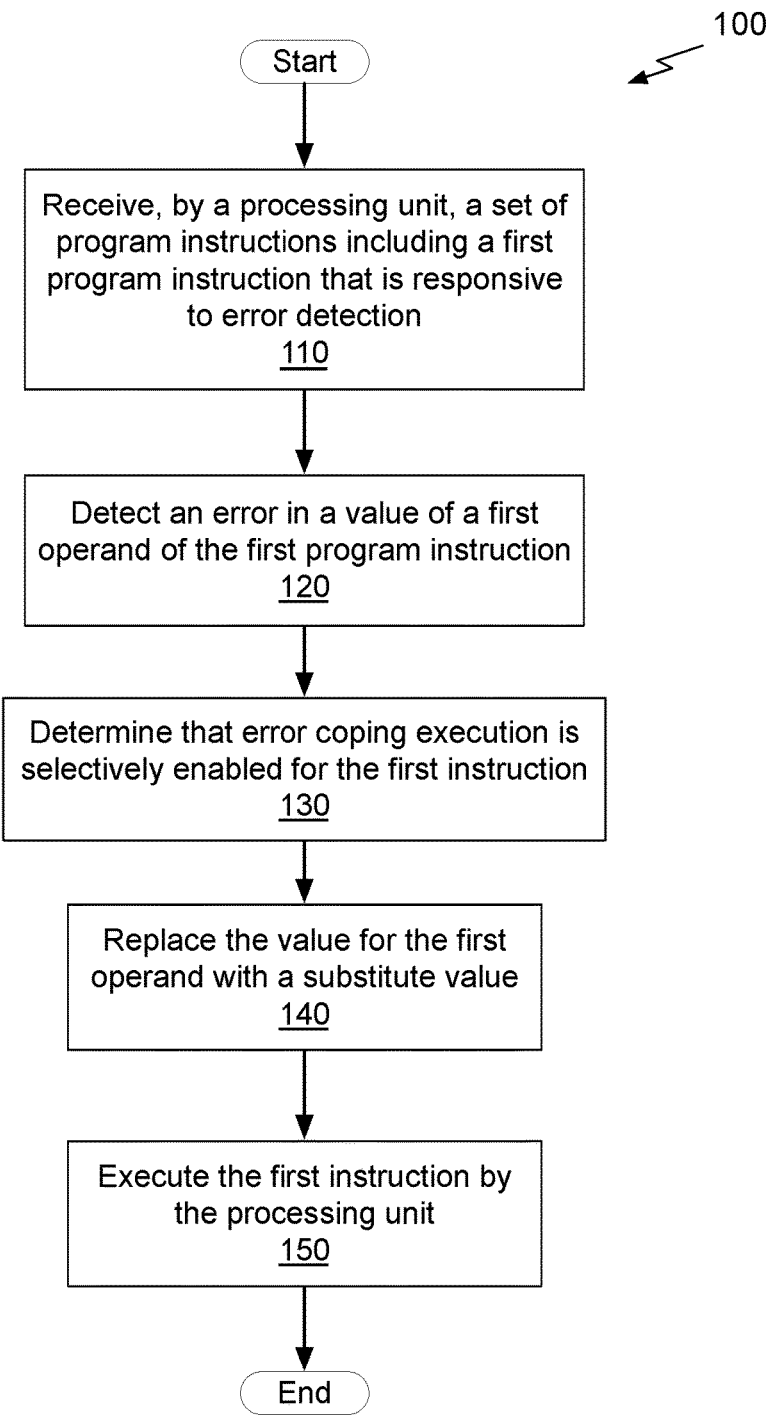
FIG. 1 illustrates a flowchart of a method for error coping, in accordance with one embodiment.

FIG. 1 illustrates a flowchart 100 of a method for error coping, in accordance with one embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processor capable of executing the program instructions. Furthermore, persons of ordinary skill in the art will understand that any system that performs method 100 is within the scope and spirit of embodiments of the present invention.

At step 110, a set of program instructions including a first program instruction that is responsive to error detection is received by a processing unit. Program instructions configured to cope with an error detected for one or more of the operands are responsive to error detection. The program instruction may replace the erroneous value with a substitute value for each operand for which an error is detected. The substitute value may be for example, a fixed value (e.g., zero, one, etc.), a software-programmed value, or others. In one embodiment, the error is reported as a non-fatal error if desired, even while the calculation operation specified by the instruction continues.

In one embodiment, the program instructions are configured to cope with errors detected for operands by adding to the instruction set alternate "error coping" versions of each instruction. In one embodiment, a bit of program state is set to true or false within a running program to control whether each instruction runs with "normal" behavior or with "error coping" behavior. In the context of the following description, "normal" (i.e., non-error coping) behavior is to pause execution of the program instructions and, if possible, request a re-fetch of operand values for which an error is detected. When re-fetching is not possible, for example, when a backing store is not available, execution of the program may be terminated and a software trap may be implemented. The programmer and/or the compiler may designate which sections of the program includes instructions configured for error coping versus normal behavior, based on knowledge of which sections of the program are resilient to error value substitution.

Error coping behavior can be implemented by a variety of instructions, including memory loads (moving data from memory to a cache or register file) and calculation operations (using values of operands read from a register file, cache, or memory). It is not necessary for every instruction in an instruction set to support the error coping behavior.

At step 120, an error in a value of a first operand of the first program instruction is detected. Storage and/or transmission circuits may be configured to detect and to flag an error in a value. For example, in one embodiment, one added parity bit may be used to detect and flag that a value has a single-bit error (the single parity bit does not indicate which bit had the error). In one embodiment, a SECDED (single-bit error correct, double-bit error detect) scheme may be used to detect and flag that a value has a double-bit error. Furthermore, persons of ordinary skill in the art will understand that other error detection schemes may be implemented.

At step 130, a determination is made that error coping execution is selectively enabled for the first instruction. In one embodiment, error coping execution for each instruction is enabled and disabled by the instruction. For example, a field in the instruction may include at least one bit that indicates whether error coping execution is enabled. In one embodiment, the field may indicate whether error coping execution is enabled, disabled, or determined at the time of execution. For example, when the first instruction within the set of instructions is executed multiple times, such as for a loop, error coping execution may be enabled for one or more times the first instruction is executed and disabled for the remaining times the first instruction is executed. In one embodiment, during processing of a first portion of layers of a neural network error coping may be enabled and error coping may be disabled for later layers of the neural network.

At step 140, the value for the first operand is replaced with a substitute value. In one embodiment, the substitute value type is specified by the instruction. For example, the substitute value type may be one of a fixed value, a programmed value, a last used value, and the like. A fixed value may be determined through simulations and then hard-wired into a circuit. A programmable value may be stored in a configuration register and can be programmed dynamically by a second program instruction. For example, in the case of a neural network, the substitute value may be determined during the training phase of the neural network. The substitute value may also be updated by the program itself during the inference phase of the neural network.

In the context of the following description, a last used value for an operand is a previous value of the operand for which an error was not detected. The last used value may be initialized to a fixed value or a programmed value. Last used values for one or more operands may be stored in a dedicated storage circuit. When an error is detected for the value of an operand for an instruction that is responsive to error detection, the value for the operand is read from the dedicated storage circuit. When an error is not detected for the value of an operand for an instruction that is responsive to error detection, the value for the operand is stored in the dedicated storage circuit.

At step 150, the first program instruction is executed by the processing unit. Importantly, when a substitute value is used for an operand, execution of the instruction may proceed without delay—even when an error is detected. Enabling execution of program instructions to continue, even when errors are detected, ensures that application programs can better satisfy real-time performance requirements.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2A:
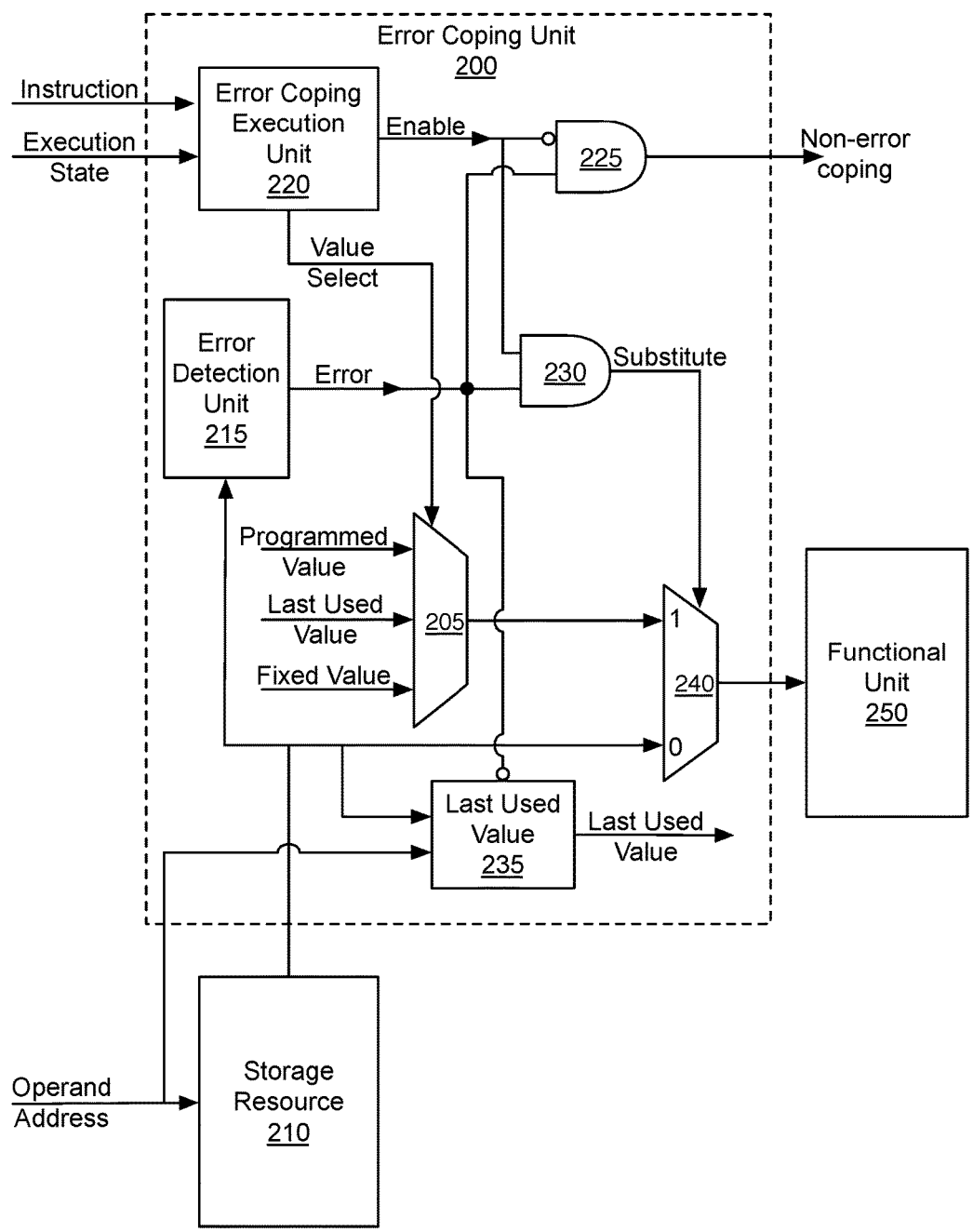
FIG. 2A illustrates a block diagram of error coping logic, in accordance with one embodiment.

FIG. 2A illustrates a block diagram of error coping logic, in accordance with one embodiment. The error coping logic includes an error coping unit 200 that is coupled to a storage resource 210 and a functional unit 250. The storage resource 210 may be a register file, addressable memory, RAM, cache, or the like, that receives an address for an operand and outputs a value of the operand to the error coping unit 200. The functional unit 250 receives the value of the operand or a substitute value generated by the error coping unit 200. Depending on the instruction, the functional unit 250 may receive at least one additional operand and additional error coping units 200 may be configured to provide the additional operands.

The error coping unit 200 includes an error detection unit 215 and an error coping execution unit 220. The error detection unit 215 determines if the value for the operand that is provided by the storage resource 210 is correct or not and generates an error signal indicating whether the value is correct or not. In one embodiment, the error detection unit 215 uses one added parity bit to detect and flag that a value has a single-bit error. In another embodiment, the error detection unit 215 uses a SECDED scheme to detect and flag that a value has a double-bit error. Furthermore, persons of ordinary skill in the art will understand that other error detection schemes may be implemented by the error detection unit 215.

As previously explained, error coping may be enabled using two different mechanisms. A first mechanism enables error coping for individual program instructions and a second mechanism enables and disables error coping by setting and clearing error coping execution for a sequence of one or more program instructions. The error coping execution unit 220 receives an instruction opcode. The instruction opcode may cause the error coping execution to be enabled or disabled for the subsequent instructions or only for the current instruction. The error coping execution unit 220 outputs an enable signal that is asserted when error coping execution is enabled and negated when error coping execution is disabled.

In one embodiment, the error coping execution unit 220 may also receive execution state for a program. For example, the execution state may specify a current iteration number for a sequence of instructions that is executed multiple times. In one embodiment, the error coping execution unit 220 may be configured to disable error coping execution or enable error coping execution based on the execution state, effectively overriding the error coping execution determined based on the instruction opcode. In one embodiment, the execution state may also indicate when execution of an instruction has caused error coping execution to be enabled or disabled for the subsequent instructions.

The error coping execution unit 220 may also receive error coping control that is included in the instruction. In one embodiment, the instruction opcode indicates that the instruction sets error coping execution and the error coping control indicates whether error coping execution is enabled or disabled for subsequent instructions. In one embodiment, the error coping control indicates whether error coping execution is enabled or disabled for the instruction. In one embodiment, the error coping execution unit 220 is configured to generate the enable signal to disable error coping execution or enable error coping execution based on the execution state, the instruction opcode, and the error coping control. In one embodiment, the error coping execution unit 220 may be configured to disable error coping execution or enable error coping execution for individual operands of the instruction based on one or more of the execution state, the instruction opcode, and the error coping control.

A logic gate 225 receives the enable signal and the error signal and generates a non-error coping signal. The non-error coping signal is asserted when an error exists and error coping execution is not enabled (i.e., is disabled). The non-error coping signal may be used to initiate non-error coping or "normal" response-to-error behavior including pausing execution of the program instructions and, if possible, requesting a re-fetch of the operand for which an error is detected. When multiple error coping units 200 are used to provide multiple operands for the instructions, a single error coping execution unit 220 and logic gate 225 may be shared by the multiple error coping units 200 and the multiple error signals generated by each error detection unit 215 may be logically ORed together before being input to the logic gate 225.

A logic gate 230 receives the enable signal and the error signal and generates a substitute signal. The substitute signal is asserted when an error exists and error coping execution is enabled. The substitute signal is used to select a substitute value for an operand to replace a value having an error.

The error coping execution unit 220 also generates a value select signal that controls the type of substitute value that is selected for the instruction. A multiplexer 205 receives the value select signal and selects one of a programmed value, a last used value, and a fixed value for output as a selected substitute value. Each last used value for an operand is stored in a last value 235 storage circuit when an error is not detected for the operand. A multiplexer 240 receives the substitute signal and selects either the selected substitute value or the value output by the storage resource 210 as the operand for output to the functional unit 250.

Figure 2B:
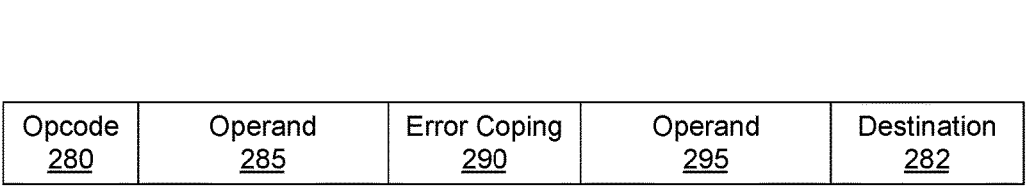
FIG. 2B illustrates fields of an instruction that is responsive to error detection, in accordance with one embodiment.

FIG. 2B illustrates fields of an instruction 275 that is responsive to error detection, in accordance with one embodiment. The instruction includes an opcode field 280 and at least a first operand field 285. The first operand field 285 specifies the location in a storage circuit where the value of the first operand is stored. The opcode field 280 specifies the operation performed by the instruction 275. In one embodiment, the opcode specifies that the instruction enables or disables error coping execution for subsequent instructions in a set of instructions that includes the instruction 275. In one embodiment, separate instructions are configured to enable error coping execution and disable error coping execution. In one embodiment, different opcodes are specified for a "normal" instruction and an "error coping" version of the same instruction. Providing two different versions of the instruction allows a compiler or programmer to simply replace individual normal instructions with error coping instructions when an error may be tolerated.

In one embodiment, the instruction also includes at least a second operand field 295 and/or a destination field 282. The second operand field 295 encodes the location in a storage circuit where the value of the second operand is stored. The destination field 282 encodes the location in a storage circuit where a result generated when the instruction 275 is executed is to be stored. In one embodiment, the instruction also includes an error coping field 290 so that error coping execution can be selectively enabled or disabled for one or more operands when the instruction 275 is executed. In one embodiment, error coping execution can be selectively enabled or disabled separately for each one of the operands. In one embodiment, when error coping execution is enabled for an operand, the error coping field 290 also encodes the substitute value type (e.g., a fixed value, a programmed value, a last used value, and the like).

Figure 2C:
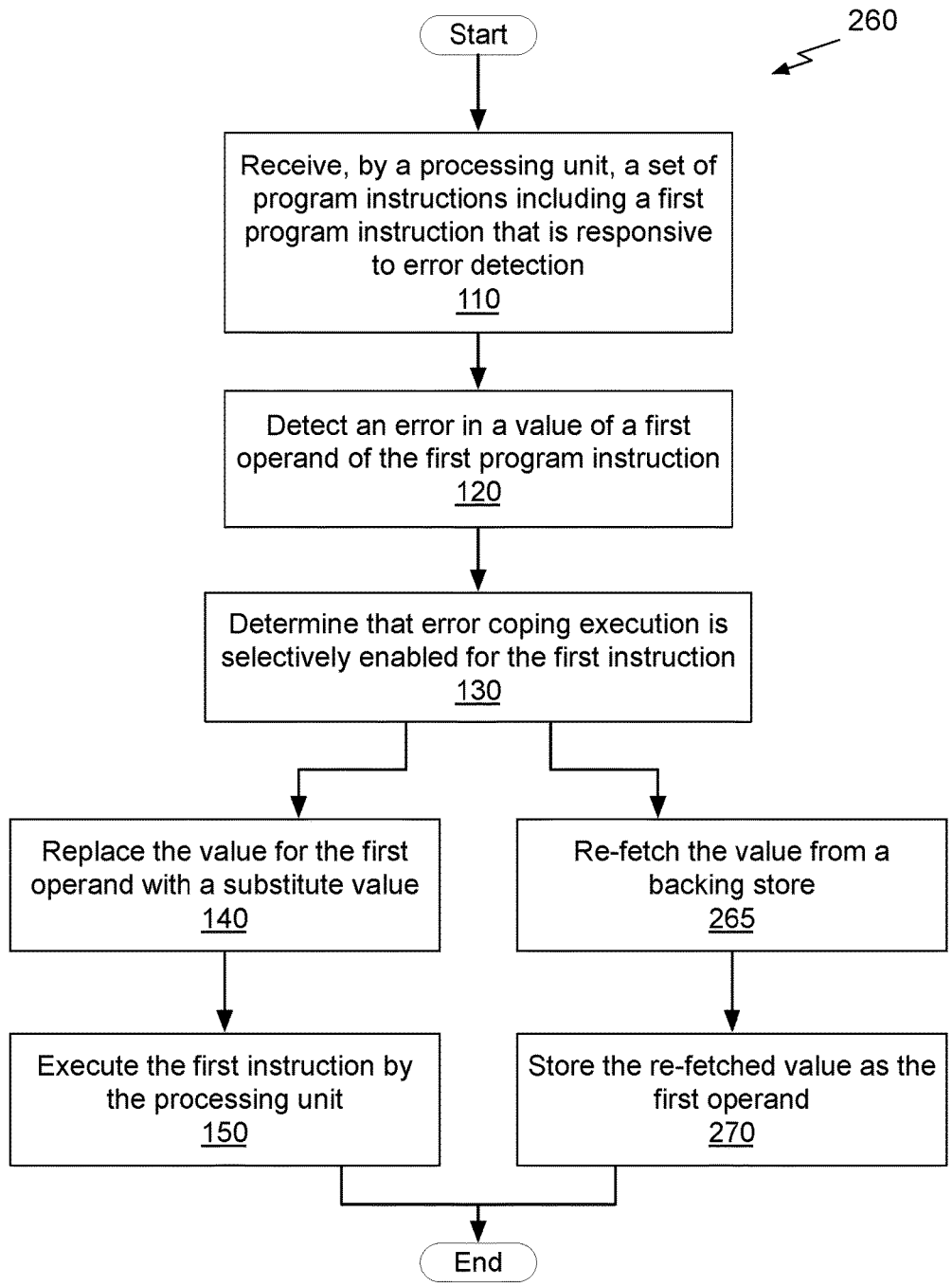
FIG. 2C illustrates another flowchart of a method for error coping, in accordance with one embodiment.

FIG. 2C illustrates another flowchart 260 of a method for error coping, in accordance with one embodiment. Operations 110, 120, 130, 140, and 150 are completed as previously described in conjunction with FIG. 1. In cases in which an error-free value of the operand can be found in a backing store, for example, a higher-level cache, detection of an error can trigger a re-fetch of the value. As shown in operation 265, the re-fetch of the value from the backing store may be performed in parallel with execution of the instruction using a substitute value.

Execution of the instruction is completed using the substitute value. When the re-fetched value is received by the processing unit, the erroneous value is overwritten with the error-free value that was re-fetched, so that the next read of the value for an operand will receive the error-free value. As shown in operation 270, the re-fetched value is stored into the location from which the first operand was obtained, thereby replacing the erroneous value for subsequent operations. Re-fetching a value without delaying execution when an error is detected can be particularly useful for real-time applications that need to meet a latency or performance constraint.

When supply voltages are lowered to intentionally operate processor circuitry near the threshold margins to reduce power consumption, the number and/or frequency of intermittent hardware faults may increase. Error coping provides a useful mechanism to enable such near-margin operation by enhancing the error tolerance of resilient algorithms that are being executed. The resulting errors are mitigated without requiring dedicated circuitry for marginality error detection such as a razor circuit.

Parallel Processing Architecture

Figure 3:
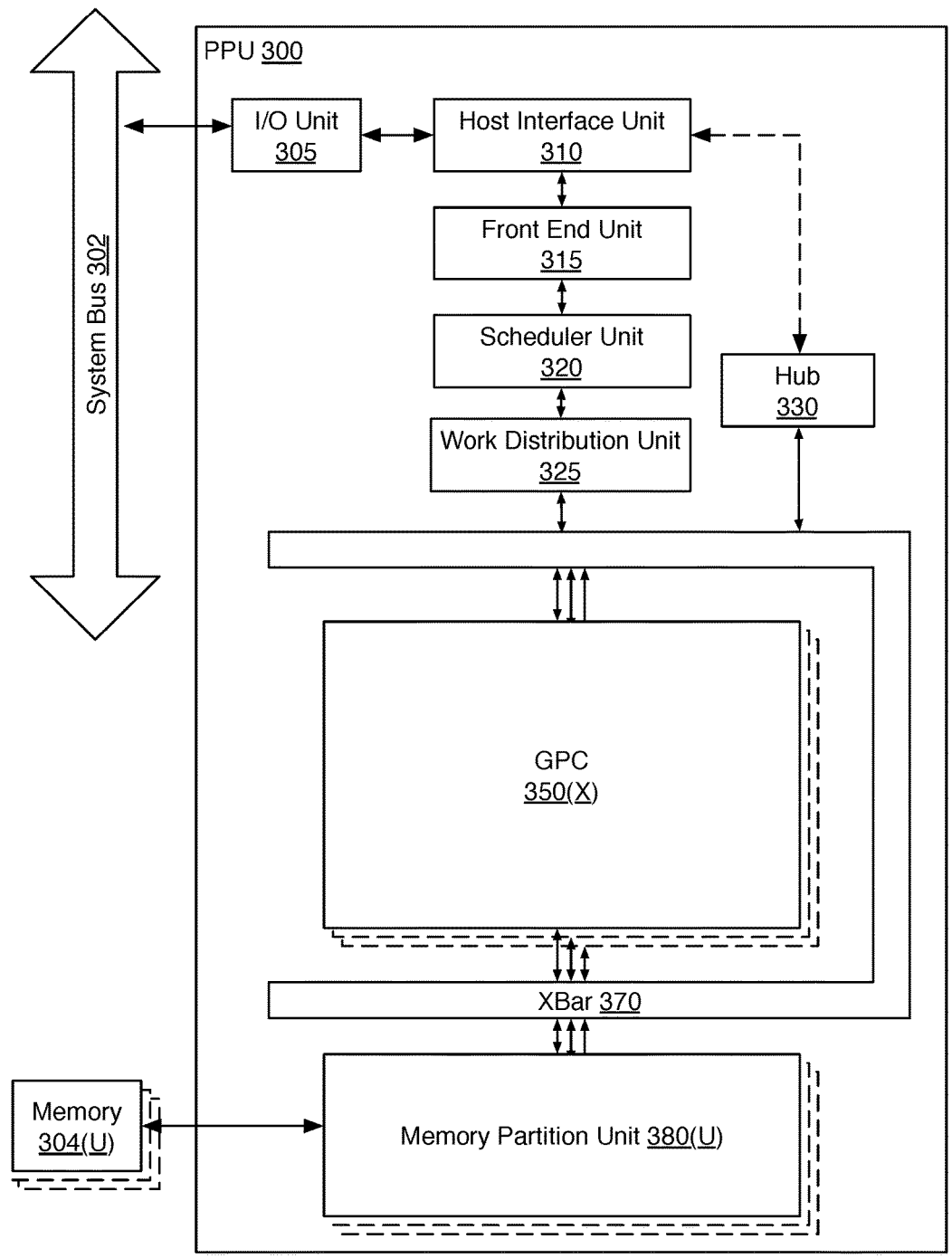
FIG. 3 illustrates a parallel processing unit, in accordance with one embodiment.

FIG. 3 illustrates a parallel processing unit (PPU) 300, in accordance with one embodiment. The PPU 300 may be configured to implement error coping when instructions are executed. In one embodiment, the PPU 300 includes one or more error coping units 200.

In one embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In one embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 3, the PPU 300 includes an Input/Output (I/O) unit 305, a host interface unit 310, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other peripheral devices via a system bus 302. The PPU 300 may also be connected to a local memory comprising a number of memory devices 304. In one embodiment, the local memory may comprise a number of dynamic random access memory (DRAM) devices.

The I/O unit 305 is configured to transmit and receive communications (i.e., commands, data, etc.) from a host processor (not shown) over the system bus 302. The I/O unit 305 may communicate with the host processor directly via the system bus 302 or through one or more intermediate devices such as a memory bridge. In one embodiment, the I/O unit 305 implements a Peripheral Component Interconnect Express (PCIe) interface for communications over a PCIe bus. In alternative embodiments, the I/O unit 305 may implement other types of well-known interfaces for communicating with external devices.

The I/O unit 305 is coupled to a host interface unit 310 that decodes packets received via the system bus 302. In one embodiment, the packets represent commands configured to cause the PPU 300 to perform various operations. The host interface unit 310 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the host interface unit 310 is configured to route communications between and among the various logical units of the PPU 300.

In one embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the host interface unit 310 may be configured to access the buffer in a system memory connected to the system bus 302 via memory requests transmitted over the system bus 302 by the I/O unit 305. In one embodiment, the host processor writes the command stream to the buffer and then transmits a pointer to the start of the command stream to the PPU 300. The host interface unit 310 provides the front end unit 315 with pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In one embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 are coupled to the host interface unit 310. The other units may also be connected to the XBar 370 via a hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. In one embodiment, the PPU 300 includes a number U of partition units 380 that is equal to the number of separate and distinct memory devices 304 coupled to the PPU 300. A partition unit 380 will be described in more detail below in conjunction with FIG. 4B.

In one embodiment, a host processor executes a driver kernel that implements an application programming interface (API) that enables one or more applications executing on the host processor to schedule operations for execution on the PPU 300. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 4A:
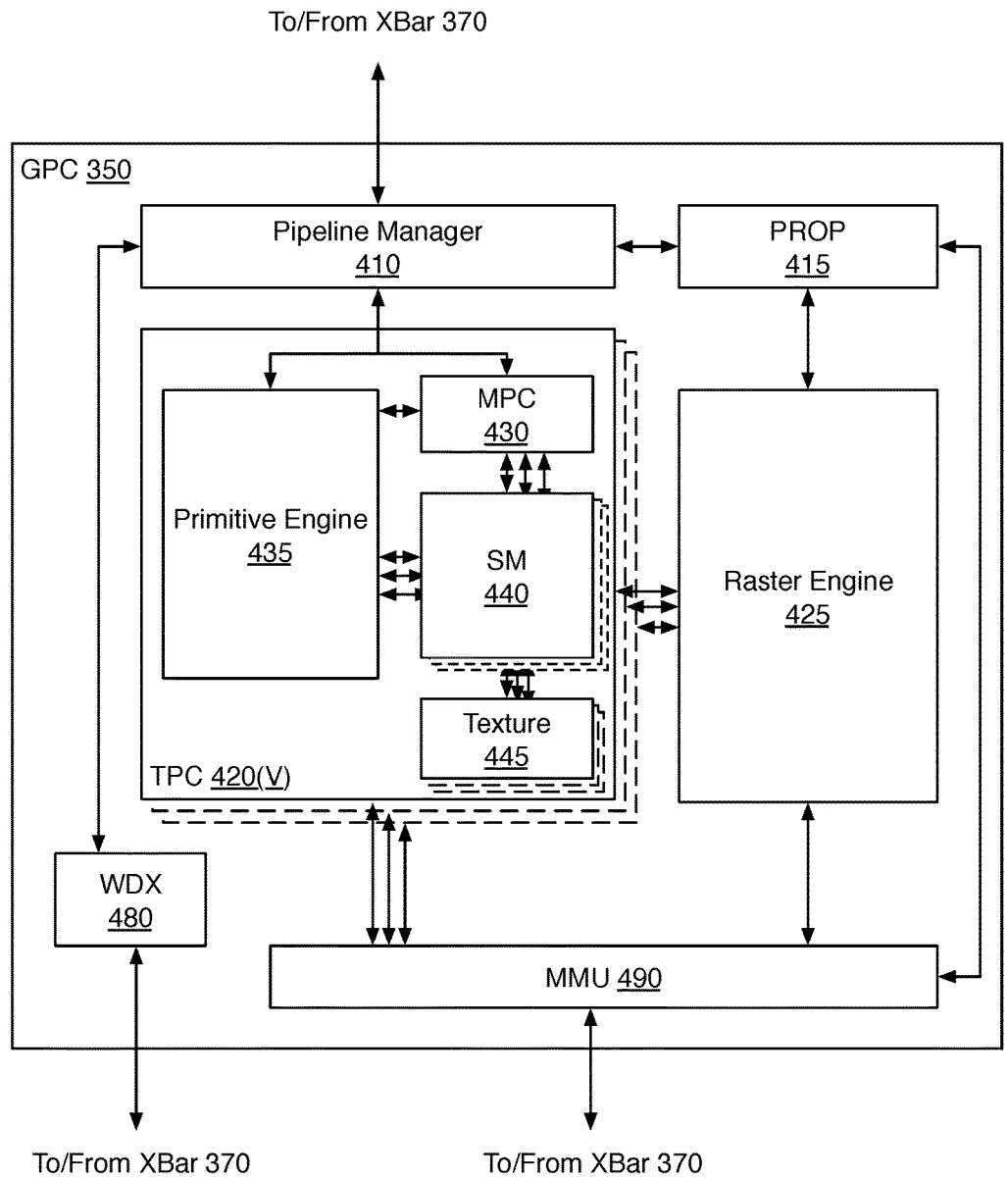
FIG. 4A illustrates a general processing cluster within the parallel processing unit of FIG. 3, in accordance with one embodiment.

FIG. 4A illustrates a GPC 350 within the PPU 300 of FIG. 3, in accordance with one embodiment. As shown in FIG. 4A, each GPC 350 includes a number of hardware units for processing tasks. In one embodiment, each GPC 350 includes a pipeline manager 410, a pre-raster operations unit (PROP) 415, a raster engine 425, a work distribution crossbar (WDX) 480, a memory management unit (MMU) 490, and one or more Texture Processing Clusters (TPCs) 420. It will be appreciated that the GPC 350 of FIG. 4A may include other hardware units in lieu of or in addition to the units shown in FIG. 4A.

In one embodiment, the operation of the GPC 350 is controlled by the pipeline manager 410. The pipeline manager 410 manages the configuration of the one or more TPCs 420 for processing tasks allocated to the GPC 350. In one embodiment, the pipeline manager 410 may configure at least one of the one or more TPCs 420 to implement at least a portion of a graphics rendering pipeline. For example, a TPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the TPCs 420 for processing by the primitive engine 435 or the SM 440.

The PROP unit 415 is configured to route data generated by the raster engine 425 and the TPCs 420 to a Raster Operations (ROP) unit in the partition unit 380, described in more detail below. The PROP unit 415 may also be configured to perform optimizations for color blending, organize pixel data, perform address translations, and the like.

The raster engine 425 includes a number of fixed function hardware units configured to perform various raster operations. In one embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may be transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 425 comprises fragments to be processed, for example, by a fragment shader implemented within a TPC 420.

Each TPC 420 included in the GPC 350 includes an M-Pipe Controller (MPC) 430, a primitive engine 435, one or more SMs 440, and one or more texture units 445. The MPC 430 controls the operation of the TPC 420, routing packets received from the pipeline manager 410 to the appropriate units in the TPC 420. For example, packets associated with a vertex may be routed to the primitive engine 435, which is configured to fetch vertex attributes associated with the vertex from the memory 304. In contrast, packets associated with a shader program may be transmitted to the SM 440.

In one embodiment, the texture units 445 are configured to load texture maps (e.g., a 2D array of texels) from the memory 304 and sample the texture maps to produce sampled texture values for use in shader programs executed by the SM 440. The texture units 445 implement texture operations such as filtering operations using mip-maps (i.e., texture maps of varying levels of detail). The texture unit 445 is also used as the Load/Store path for SM 440 to MMU 490. In one embodiment, each TPC 420 includes two (2) texture units 445.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In one embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 440 is described in more detail below in conjunction with FIG. 5.

The MMU 490 provides an interface between the GPC 350 and the partition unit 380. The MMU 490 may provide translation of virtual addresses into physical addresses, memory protection, and arbitration of memory requests. In one embodiment, the MMU 490 provides one or more translation lookaside buffers (TLBs) for performing translation of virtual addresses into physical addresses in the memory 304.

Figure 4B:
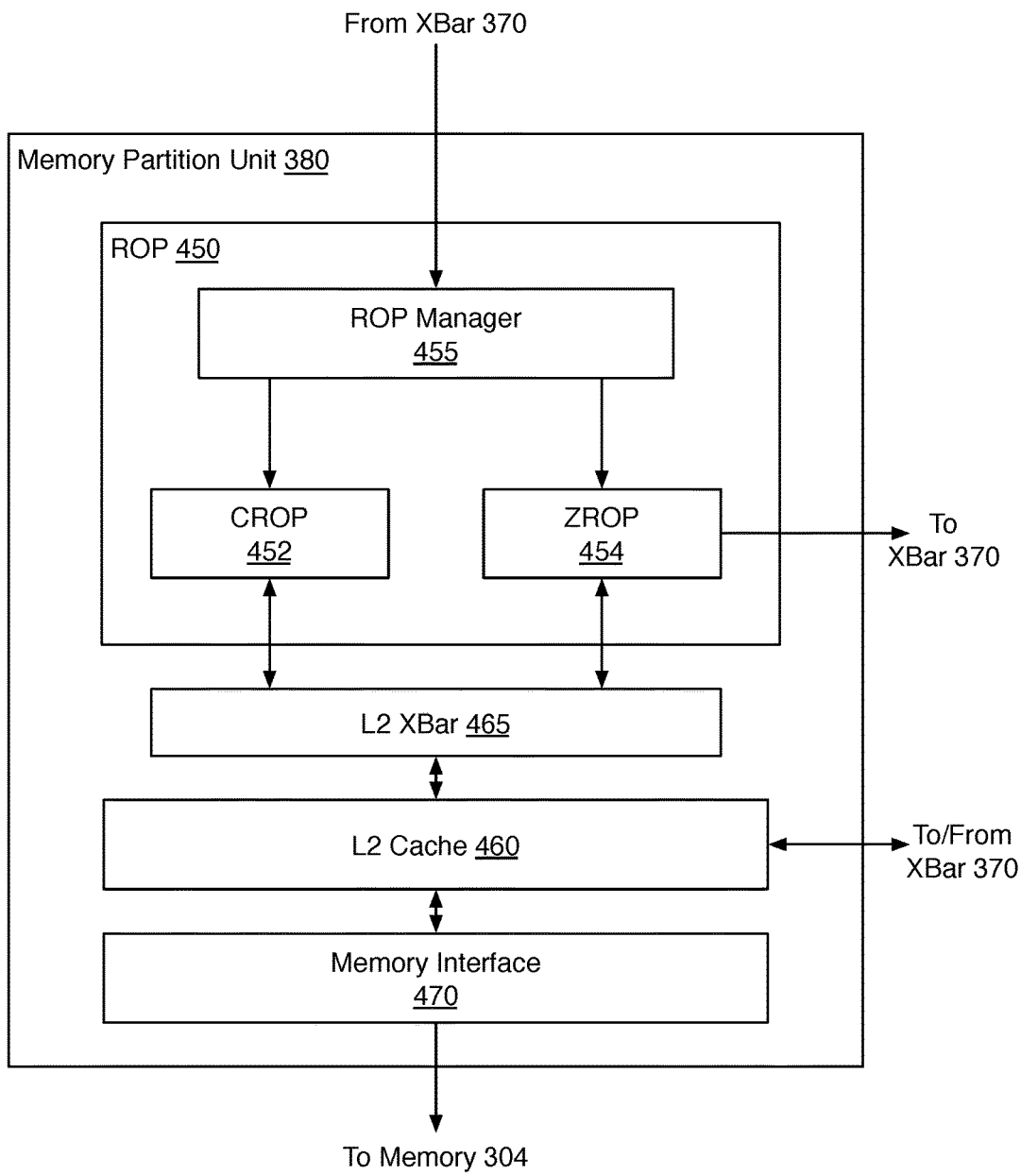
FIG. 4B illustrates a memory partition unit of the parallel processing unit of FIG. 3, in accordance with one embodiment.

FIG. 4B illustrates a memory partition unit 380 of the PPU 300 of FIG. 3, in accordance with one embodiment. As shown in FIG. 4B, the memory partition unit 380 includes a Raster Operations (ROP) unit 450, a level two (L2) cache 460, a memory interface 470, and an L2 crossbar (XBar) 465. The memory interface 470 is coupled to the memory 304. Memory interface 470 may implement 16, 32, 64, 128-bit data buses, or the like, for high-speed data transfer. In one embodiment, the PPU 300 incorporates U memory interfaces 470, one memory interface 470 per partition unit 380, where each partition unit 380 is connected to a corresponding memory device 304. For example, PPU 300 may be connected to up to U memory devices 304, such as graphics double-data-rate, version 5, synchronous dynamic random access memory (GDDR5 SDRAM). In one embodiment, the memory interface 470 implements a DRAM interface and U is equal to 8.

In one embodiment, the PPU 300 implements a multi-level memory hierarchy. The memory 304 is located off-chip in SDRAM coupled to the PPU 300. Data from the memory 304 may be fetched and stored in the L2 cache 460, which is located on-chip and is shared between the various GPCs 350. As shown, each partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 includes a ROP Manager 455, a Color ROP (CROP) unit 452, and a Z ROP (ZROP) unit 454. The CROP unit 452 performs raster operations related to pixel color, such as color compression, pixel blending, and the like. The ZROP unit 454 implements depth testing in conjunction with the raster engine 425. The ZROP unit 454 receives a depth for a sample location associated with a pixel fragment from the culling engine of the raster engine 425. The ZROP unit 454 tests the depth against a corresponding depth in a depth buffer for a sample location associated with the fragment. If the fragment passes the depth test for the sample location, then the ZROP unit 454 updates the depth buffer and transmits a result of the depth test to the raster engine 425. The ROP Manager 455 controls the operation of the ROP unit 450. It will be appreciated that the number of partition units 380 may be different than the number of GPCs 350 and, therefore, each ROP unit 450 may be coupled to each of the GPCs 350. Therefore, the ROP Manager 455 tracks packets received from the different GPCs 350 and determines which GPC 350 that a result generated by the ROP unit 450 is routed to. The CROP unit 452 and the ZROP unit 454 are coupled to the L2 cache 460 via an L2 XBar 465.

Figure 5:
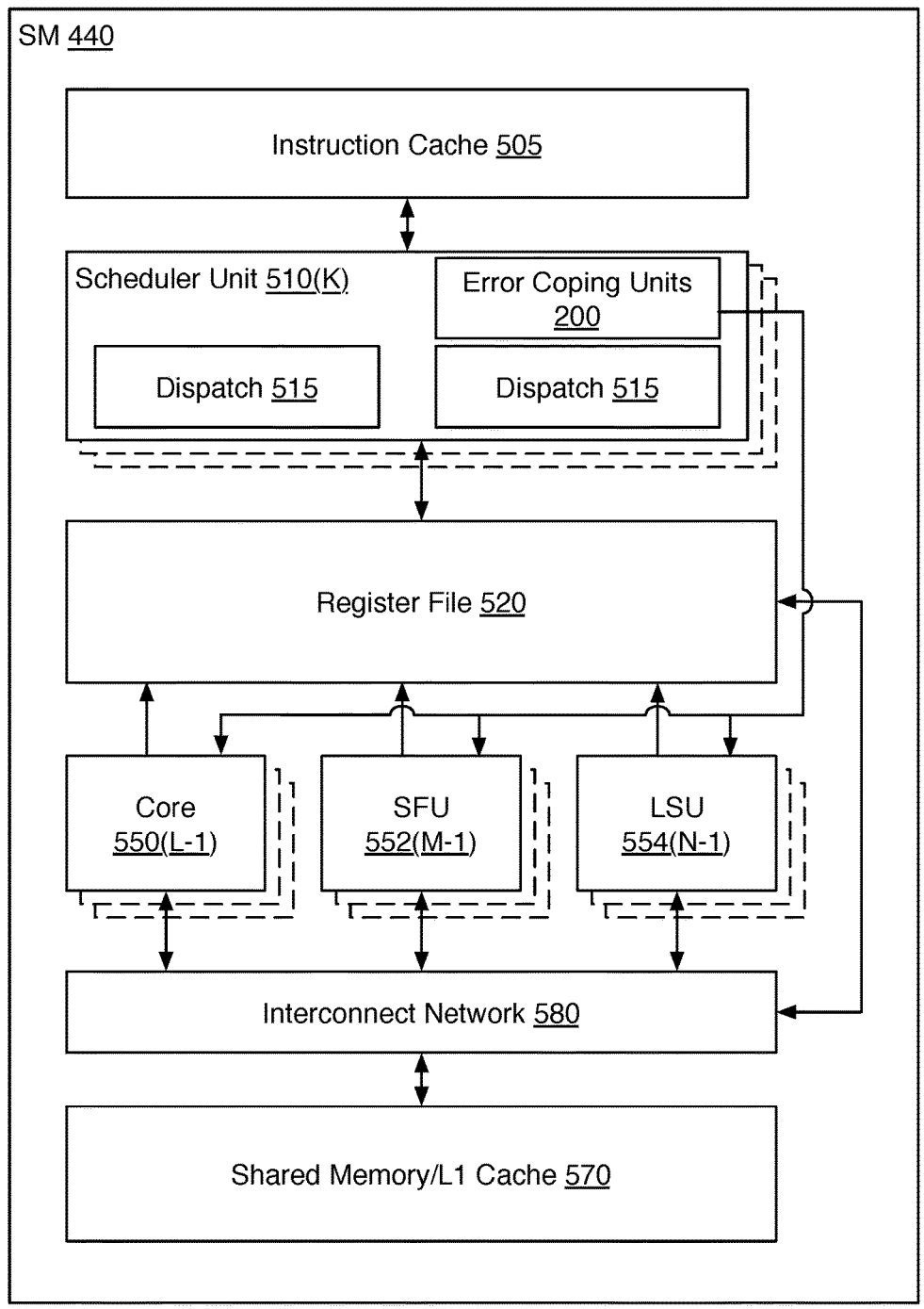
FIG. 5 illustrates the streaming multi-processor of FIG. 4A, in accordance with one embodiment.

FIG. 5 illustrates the streaming multi-processor 440 of FIG. 4A, in accordance with one embodiment. As shown in FIG. 5, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular TPC 420 within a GPC 350 and, if the task is associated with a shader program, the task may be allocated to an SM 440. The scheduler unit 510 receives the tasks from the work distribution unit 325 and manages instruction scheduling for one or more groups of threads (i.e., warps) assigned to the SM 440. The scheduler unit 510 schedules threads for execution in groups of parallel threads, where each group is called a warp. In one embodiment, each warp includes 32 threads. The scheduler unit 510 may manage a plurality of different warps, scheduling the warps for execution and then dispatching instructions from the plurality of different warps to the various functional units (i.e., cores 550, SFUs 552, and LSUs 554) during each clock cycle.

In one embodiment, each scheduler unit 510 includes one or more instruction dispatch units 515 and at least one error coping unit 200. The at least one error coping unit 200 outputs operand values to the various functional units. When an error is detected in a value for an operand, the at least one error coping unit 200 may selectively replace the erroneous value for an operand with a substitute value based on the instruction and/or execution state.

Each dispatch unit 515 is configured to transmit instructions to one or more of the functional units. In the embodiment shown in FIG. 5, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In one embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In one embodiment, the SM 440 includes a large number (e.g., 128, etc.) of distinct processing cores 550. Each core 550 may include a fully-pipelined, single-precision processing unit that includes a floating point arithmetic logic unit and an integer arithmetic logic unit. The core 550 may also include a double-precision processing unit including a floating point arithmetic logic unit. In one embodiment, the floating point arithmetic logic units implement the IEEE 754-2008 standard for floating point arithmetic. Each SM 440 also comprises M SFUs 552 that perform special functions (e.g., attribute evaluation, reciprocal square root, and the like), and N LSUs 554 that implement load and store operations between the shared memory/L1 cache 570 and the register file 520. In one embodiment, the SM 440 includes 128 cores 550, 32 SFUs 552, and 32 LSUs 554.

Each SM 440 includes an interconnect network 580 that connects each of the functional units to the register file 520 and the LSU 554 to the register file 520, shared memory/L1 cache 570. In one embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In one embodiment, the shared memory/L1 cache 570 comprises 64 KB of storage capacity and is in the path from the SM 440 to the partition unit 380. The shared memory/L1 cache 570 can be used to cache reads and writes. In one embodiment, the scheduler unit 510 initiates re-fetches of values received from the register file 520 for which errors are detected by the error coping unit 200 and stores the error-free values into the register file 520. In one embodiment, the scheduler unit 510 initiates re-fetches of values received from the shared memory/L1 cache 570 for which errors are detected by the error coping unit 200 and stores the error-free values into the shared memory/L1 cache 570 and/or register file 520. One or more of the shared memory/L1 cache 570, L2 cache 460, and memory 304 are backing stores.

The PPU 300 described above may be configured to perform highly parallel computations much faster than conventional CPUs. Parallel computing has advantages in graphics processing, data compression, neural networks, deep learning, biometrics, stream processing algorithms, and the like.

When configured for general purpose parallel computation, a simpler configuration can be used. In this model, as shown in FIG. 3, fixed function graphics processing units are bypassed, creating a much simpler programming model. In this configuration, the work distribution unit 325 assigns and distributes blocks of threads directly to the TPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write Global memory through partition shared memory/L1 cache 570 and partition unit 380. When configured for general purpose parallel computation, the SM 440 can also write commands that scheduler unit 320 can use to launch new work on the TPCs 420.

In one embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display).

An application writes model data for a scene (i.e., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In one embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (i.e., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 300 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 300 is embodied on a single semiconductor substrate. In another embodiment, the PPU 300 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 300 may be included on a graphics card that includes one or more memory devices 304 such as GDDR5 SDRAM. The graphics card may be configured to interface with a PCIe slot on a motherboard of a desktop computer that includes, e.g., a northbridge chipset and a southbridge chipset. In yet another embodiment, the PPU 300 may be an integrated graphics processing unit (iGPU) included in the chipset (i.e., Northbridge) of the motherboard.

Various programs may be executed within the PPU 300 in order to implement the various layers of a neural network. For example, the device driver may launch a kernel on the PPU 300 to implement the neural network on one SM 440 (or multiple SMs 440). The device driver (or the initial kernel executed by the PPU 300) may also launch other kernels on the PPU 300 to perform other layers of the neural network. In addition, some of the layers of the neural network may be implemented on fixed unit hardware implemented within the PPU 300. It will be appreciated that results from one kernel may be processed by one or more intervening fixed function hardware units before being processed by a subsequent kernel on an SM 440.

Exemplary System

Figure 6:
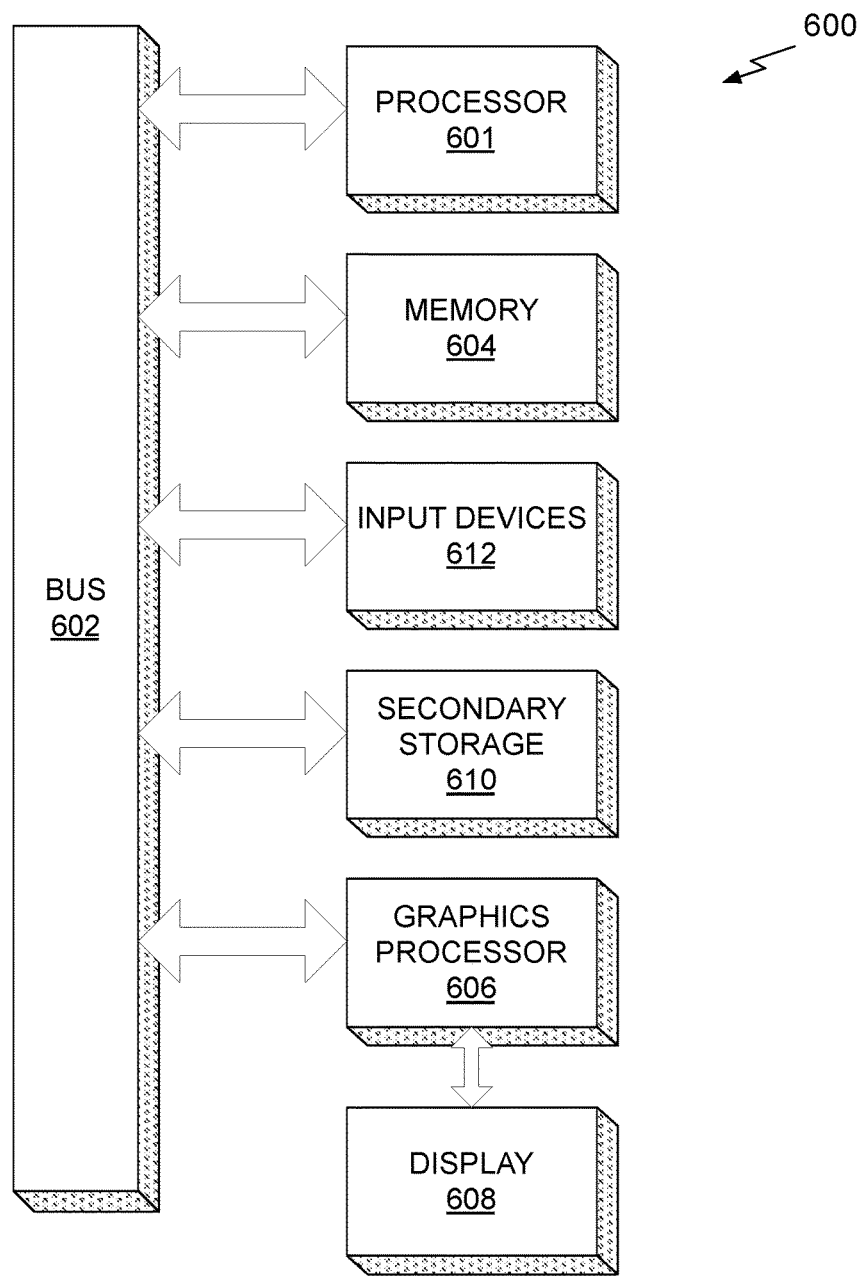
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. The exemplary system 600 may be configured to support error coping.

As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). In one embodiment, the communication bus 602 is the system bus 302 shown in FIG. 3. The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving, by a processing unit, a set of program instructions including a first program instruction that is responsive to error detection, wherein the first program instruction includes an opcode;
detecting an error in a value of a first operand of the first program instruction;
determining that error coping execution is selectively enabled for the first program instruction;
replacing the value for the first operand with a substitute value; and
executing, by the processing unit, the first program instruction including the opcode and the substitute value.

2. The method of claim 1, wherein a field within the first program instruction indicates that the error coping execution is selectively enabled.

3. The method of claim 1, further comprising, prior to receiving the first program instruction, receiving a second instruction that selectively enables the error coping execution for at least the first program instruction.

4. The method of claim 1, wherein detecting the error in the value of the first operand comprises computing parity for the first operand.

5. The method of claim 1, wherein the value of the first operand is read from a storage resource.

6. The method of claim 5, wherein the storage resource comprises at least one of a dynamic random access memory, a register, a flip-flop, or a latch circuit.

7. The method of claim 1, wherein the substitute value is a constant.

8. The method of claim 1, wherein the substitute value is programmed by a second program instruction.

9. The method of claim 1, wherein the substitute value is a previous value of the first operand for which an error was not detected.

10. The method of claim 1, wherein the substitute value is computed while the set of program instructions is executed.

11. The method of claim 1, further comprising:
fetching a second value from a backing store; and
overwriting the value of the first operand by storing the second value into a location from which the first operand was obtained.

12. The method of claim 1, wherein the error coping execution is determined during execution of the set of program instructions.

13. The method of claim 1, wherein the set of program instructions includes a second program instruction that is responsive to error detection, and further comprising:
detecting an error in a value of a second operand of the second program instruction;
determining that error coping execution is selectively disabled for the second instruction; and
executing the second program instruction by the processing unit.

14. A processing unit, comprising:
a memory resource configured to store a value of a first operand;
an error coping unit coupled to the memory resource and configured to:
receive a set of program instructions including a first program instruction that includes an opcode and is responsive to error detection;
detect an error in the value of the first operand of the first program instruction;
determine that error coping execution is selectively enabled for the first program instruction; and
replace the value for the first operand with a substitute value; and
a functional unit that is coupled to the error coping unit, wherein the functional unit executes the first program instruction including the opcode and the substitute value.

15. The processing unit of claim 14, wherein a field within the first program instruction indicates that the error coping execution is selectively enabled.

16. The processing unit of claim 14, wherein, prior to receiving the first program instruction, the error coping unit is further configured to receive a second instruction that selectively enables the error coping execution for at least the first program instruction.

17. The processing unit of claim 14, wherein the substitute value is a previous value of the first operand for which an error was not detected.

18. The processing unit of claim 14, wherein the error coping unit is further configured to:
fetch a second value from a backing store; and
overwriting the value of the first operand by storing the second value into a location from which the first operand was obtained.

19. The processing unit of claim 14, wherein the error coping unit determines that error coping execution is selectively enabled for the first instruction during execution of the set of program instructions.

20. A non-transitory, computer-readable storage medium storing instructions that, when executed by a processor, cause the processor to perform steps comprising:
receiving a set of program instructions including a first program instruction that is responsive to error detection, wherein the first program instruction includes an opcode;
detecting an error in a value of a first operand of the first program instruction;
determining that error coping execution is selectively enabled for the first program instruction;
replacing the value for the first operand with a substitute value; and
executing the first program instruction including the opcode and the substitute value.

\* \* \* \* \*

UNITED STATES PATENT AND TRADEMARK OFFICE
CERTIFICATE OF CORRECTION

PATENT NO. : 10,216,521 B2  
APPLICATION NO. : 15/628403  
DATED : February 26, 2019  
INVENTOR(S) : Philip Payman Shirvani et al.

It is certified that error appears in the above-identified patent and that said Letters Patent is hereby corrected as shown below:

In the Specification

At Column 1, Line number 4, please add the following sentence:
--This invention was made with US Government support under LLNS subcontract B609487 awarded by DOE. The US Government has certain rights in this invention.--

Signed and Sealed this
Fourteenth Day of July, 2020

Andrei Iancu
*Director of the United States Patent and Trademark Office*